United States Patent
Ohashi et al.

(10) Patent No.: US 6,844,107 B2
(45) Date of Patent: Jan. 18, 2005

(54) BATTERY HOLDER FOR BUTTON-TYPE BATTERY

(75) Inventors: Yoshihiro Ohashi, Miyagi-ken (JP); Takatoshi Koyama, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 233 days.

(21) Appl. No.: 09/968,372

(22) Filed: Oct. 1, 2001

(65) Prior Publication Data

US 2002/0039676 A1 Apr. 4, 2002

(30) Foreign Application Priority Data

Oct. 2, 2000 (JP) .................................. 2000-306629

(51) Int. Cl.$^7$ .................................................. H01M 2/10
(52) U.S. Cl. ............................ 429/97; 429/96; 429/100
(58) Field of Search ........................... 429/99, 100, 96, 429/97, 98, 177, 178, 179, 163

(56) References Cited

U.S. PATENT DOCUMENTS 5,876,241 A * 3/1999 Frantz ........................ 439/500
6,087,037 A * 7/2000 Rieder ......................... 429/99

FOREIGN PATENT DOCUMENTS

| JP | Sho 59-78445 | | 5/1984 | |
| JP | 59-078445 | * | 5/1984 | ............ H01M/2/10 |
| JP | 2001642632 | * | 9/2001 | ............ H01M/2/10 |

* cited by examiner

Primary Examiner—Michael Barr
Assistant Examiner—Monique Wills
(74) Attorney, Agent, or Firm—Brinks Hofer Gilson & Lione (57) ABSTRACT

A battery holder has an opening and first and second preventive parts provided to an upper wall of a case body and a hole communicating with space in the second preventative side of a side wall of the case body. When the battery is extracted from the case body, it is moved against an elastic contact force of the battery's first terminal via the hole, prevention by the second preventive part is released and the battery can be extracted from the opening.

11 Claims, 6 Drawing Sheets

BATTERY HOLDER FOR BUTTON-TYPE BATTERY

BACKGROUND OF THE INVENTION

1. Field of the Invention

The present invention relates to a battery holder for a disc-like button-type battery such as a lithium battery.

2. Description of the Related Art

Referring to FIGS. 6 to 11, conventional type battery holder for a button-type battery will be described below.

A reference number 11 denotes a button-type battery such as a lithium battery, 12a denotes one surface of it, 12b denotes a circumferential face, 12c denotes the other surface, the other surface 12c and the circumferential face 12b are integrated by a metal plate and normally function as a positive electrode. A metal plate forming one surface 12a is insulated from the positive electrode and functions as a negative electrode.

A reference number 13 denotes a battery holder as a whole and the battery holder is composed of a holder body 14, a first terminal 15 and a second terminal 16.

Figure 10:
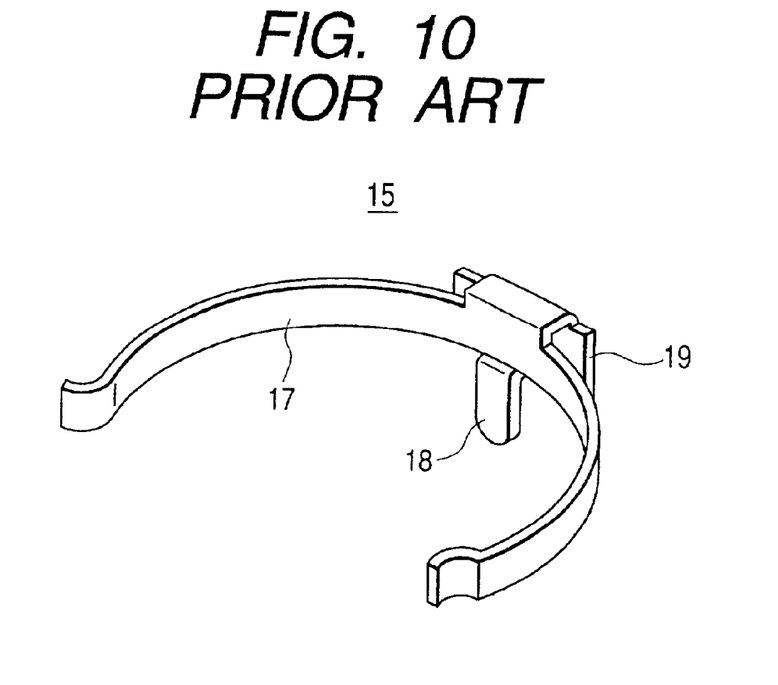
FIG. 10 is a perspective view showing a first terminal in the conventional type battery holder for a button-type battery.

The first terminal 15 is made of conductive and elastic material and as clear from FIG. 10, is composed of a contact part 17, a protruded piece 18 and a fitting piece 19 folded downward at the back of the contact part 17. A bent piece 19a is further formed on the fitting piece 19. Needless to say, each part and each piece are integrated.

Figure 11:
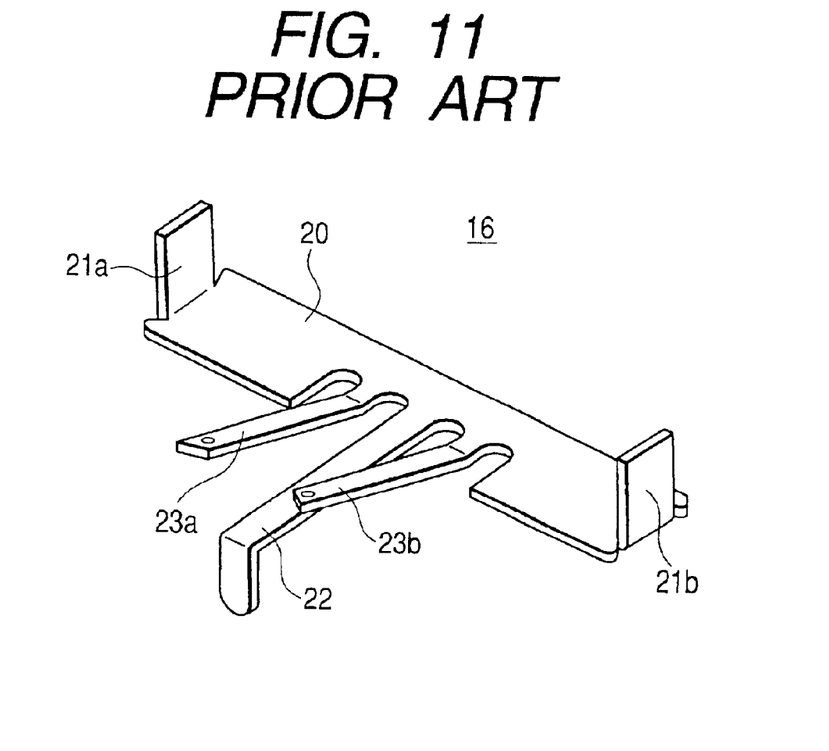
FIG. 11 is a perspective view showing a second terminal in the conventional type battery holder for a button-type battery.

The second terminal 16 is similarly made of conductive and elastic material, as clear from FIG. 11, is composed of a main plate part 20, folded pieces 21a and 21b, an extended piece 22 protruded in a direction perpendicular to the longitudinal direction of the main plate part 20 and a pair of contact pieces 23a and 23b acquired by tilting them from the surface of the main plate part 20 and these contact pieces 23a and 23b are actually mechanically and electrically touched to one surface 12a of the battery 11.

The end of the extended piece 22 is folded downward, a protruded piece 22a is formed and the width of each of the folded pieces 21a and 21b is formed so that it is narrower than that of the main plate part 20. For the second terminal 16, each part and each piece are also integrated.

Figure 6:
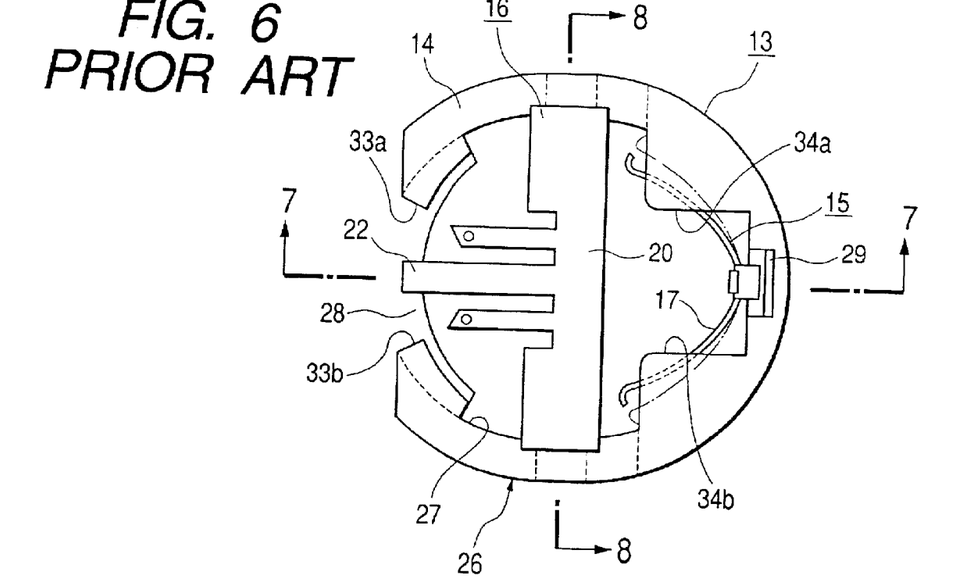
FIG. 6 is a plan showing conventional type battery holder for a button-type battery.

The holder body 14 is formed by insulating material such as synthetic resin by so-called molding, is provided with a plate part 25 corresponding to one surface 12a of the battery 11 and a circumferential part 26 corresponding to the circumferential face 12b of the battery 11, a part corresponding to the other surface 12c of the battery 11 is open, a so-called opening 27 is formed, a part of the circumferential part 26 is cut out and a cut-out part 28 is formed. The cut-out part 28 is formed so that it has relatively large area.

A through hole 29 is formed on the reverse side to the cut-out part 28 of the circumferential part 26, a through hole 30 is formed through the plate part 25 and further, fitting holes 31a and 31b are respectively formed in the right and left parts of the circumferential part 26 (parts located in a direction perpendicular to a line connecting the cut-out part 28 and the through hole 29). The width of each of the fitting holes 31a and 31b is set so that the width is slightly larger than that of each of the folded pieces 21a and 21b of the second terminal 16.

Front flanges 33a and 33b and rear flanges 34a and 34b which block a part of the opening 27 are formed on both sides of the cut-out part 28 and on the reverse side of the cut-out part 28 on the circumferential part 26 of the holder body 14.

The first terminal 15 is arranged in the rear (on the reverse side to the cut-out part 28) of the holder body 14 in a state in which the protruded piece 18 is inserted into the through hole 30 of the plate part 25 and the fitting piece 19 is inserted into the through hole 29 of the circumferential part 26, however, in a state in which the battery 11 is not housed (an unused state) the curved contact part 17 is also arranged between the plate part 25 and the rear flanges 34a and 34b.

Therefore, when the first terminal 15 is once arranged in a predetermined position, it is never uncoupled from the holder body 14. In this state, the bent piece 19a of the fitting piece 19 is fitted to a part of the circumferential part 26.

The second terminal 16 is attached to the holder body 14 by fitting the folded pieces 21a and 21b (particularly their upper ends) on both sides into the fitting holes 31a and 31b of the circumferential part 26. At this time, as the width of the main plate part 20 of the second terminal 16 is larger than that of the fitting holes 31a and 31b, the second terminal 16 never falls outside the holder body 14 through the fitting hole 31a or 31b.

Figure 7:
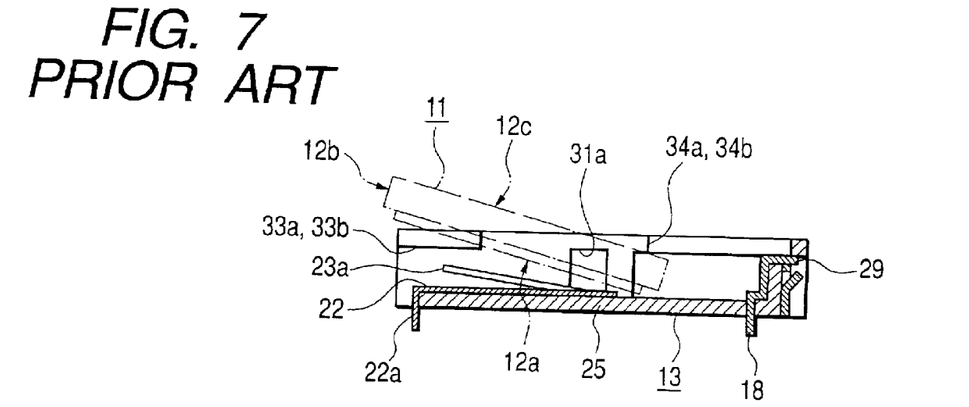
FIG. 7 is a sectional view viewed along a line 7—7 shown in FIG. 6.
Figure 8:
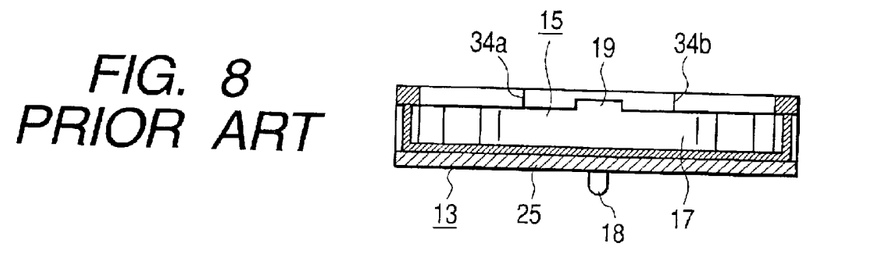
FIG. 8 is a sectional view viewed along a line 8—8 shown in FIG. 6.
Figure 9:
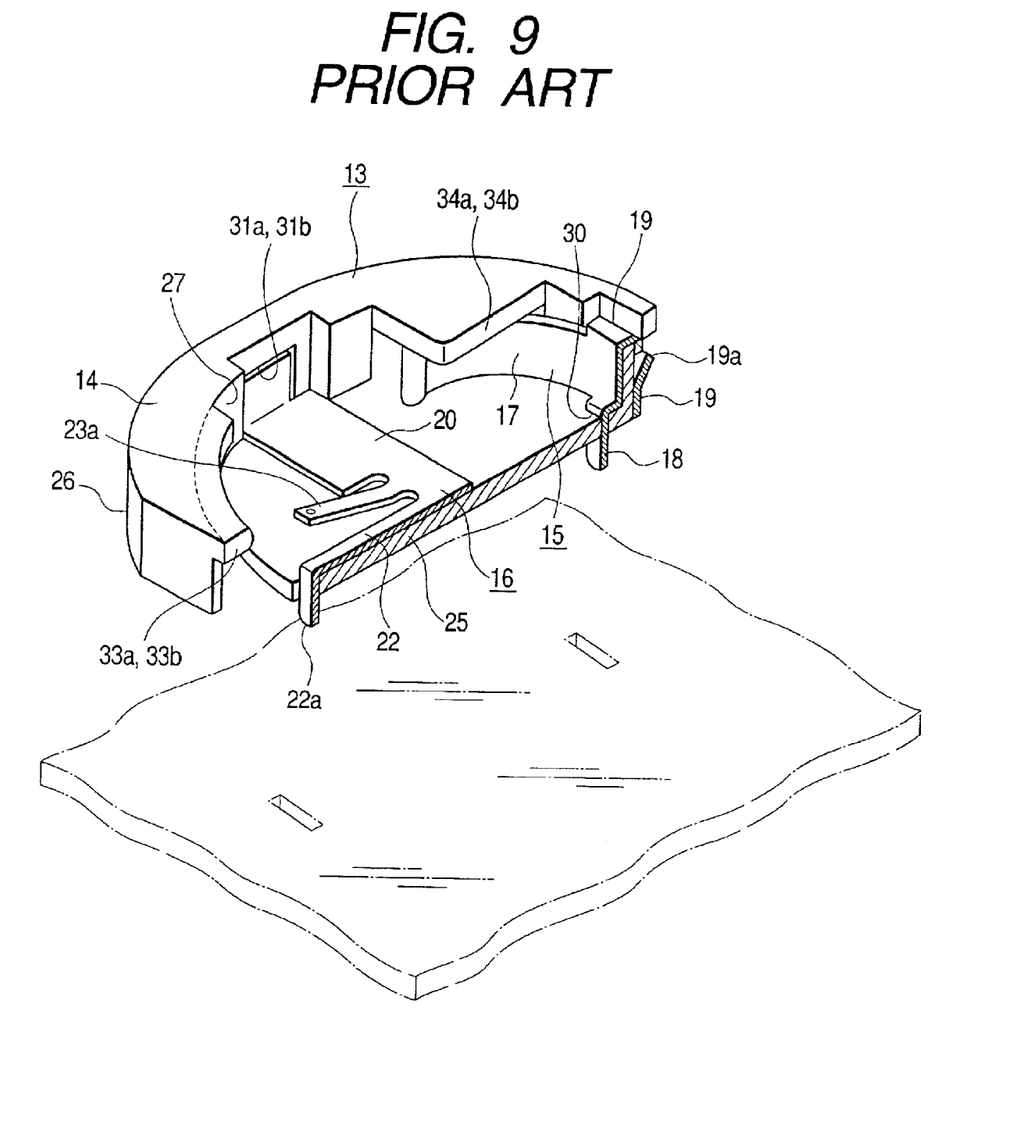
FIG. 9 is a perspective view showing a state in which the body of a case is cut along the line 7—7 shown in FIG. 6.

According to a such configuration, as shown in FIG. 7, when the battery 11 is inserted by pressing it on the first terminal 15 from the side of the cut-out part 28 through the opening 27 of the battery holder 13, the contact part 17 of the first terminal 15 is backed by this pressure and the end on the side of the cut-out part 28 of the battery 11 is moved from the front flanges 33a and 33b to a back position.

At this time, when the battery 11 is pressed on the inside of the battery holder 13, it is lowered against spring by the contact pieces 23a and 23b of the second terminal 16, when the battery becomes lower than the front flanges 33a and 33b, it is pressed forward, that is, in a direction of the cut-out part 28 by the spring of the first terminal 15 and the circumferential face on the side of the front end of the battery 11 is pressed on the inner face of the circumferential part 26 in the vicinity of both sides of the cut-out part 28 of the battery holder 13.

The other surface 12c of the housed battery 11 is pressed by the front flanges 33a and 33b and the rear flanges 34a and 34b of the battery holder 13, hereby, the battery 1 can be prevented from falling outside via the opening 27 and is stably and securely secured in the battery holder 13. These flanges 33a, 33b, 34a and 34b function as a preventive part. Voltage can be acquired between the first terminal 15 and the second terminal 16.

When the battery 11 housed in the battery holder 13 as described above is strongly pushed in a direction of the first terminal 15 with a fingertip put on the cut-out part 28 of the battery holder 13, it can be separated from the front flanges 33a and 33b of the battery holder 13, that is, from a presser, that is, the battery 11 can be lifted outside the battery holder 13 from the front end of the battery 11, as a result, it is picked up with fingertips and can be extracted.

The conventional type battery holder for a button-type battery has a problem that as the battery 11 is extracted from the cut-out part 28 with a fingertip put on the cut-out part 28 provided to the battery holder 13 as described above when the battery 11 housed in the battery holder 13 is extracted and the battery 11 is not held in the cut-out part 28, the battery 11 sometimes falls out of the battery holder 13 easily.

SUMMARY OF THE INVENTION

The battery holder for a button-type battery according to the invention is devised to solve the problem and the object is to provide battery holder for a button-type battery in which a button-type battery can be securely held and does not uncouple out of the housing easily.

The battery holder for a button-type battery according to the invention is based upon the battery holder for made of insulating material of a button-type battery being disk-like and having a circular side and flat surfaces, is provided with a case body having an upper wall and a side wall provided to a limb of the upper wall, a base material arranged on an open side of the side wall of the case body so that space exists between the upper wall and the base material, an elastic first terminal and an elastic second terminal arranged in the space between the upper wall and the base material and provided on the base material, and is constituted such that an opening as well as first and second preventive parts respectively opposite in a part of the limb of the opening are provided on the upper wall of the case body, a circumferential wall corresponding to the circular side of the button-type battery is provided in the vicinity of the second preventive part, a hole communicating with space is provided to the side wall of the case body, the hole is located on the second preventive part side of the opening, the first terminal is provided opposite to the first preventive part, the second terminal is provided so that it faces the opening, the button-type battery is inserted from the opening into the space, the first terminal is elastically touched to the circular side of the button-type battery, the button-type battery is pressed in a direction of the circular side opposite to the elastically touched circular side, the circular side is touched to the circumferential wall and the second terminal is elastically touched to one of the flat surfaces of the button-type battery, the button-type battery is pressed in a direction of the other flat surface of the button-type battery, the other flat surface is touched to inner faces of the first and second preventive parts and the button-type battery is housed in the space, when the button-type battery housed in the space is extracted from the case body, it is moved against an elastic contact force of the first terminal via the hole of the side wall of the case body, prevention by the second preventive part is released, and the button-type battery can be extracted from the opening of the case body.

According to a such configuration, the button-type battery can be securely held in the space by a pair of first and second preventive parts in the case body, and since the button-type battery is extracted through the hole of the side wall, the preventive part can also be formed in the hole, therefore, a range in which a pair of first and second preventive parts are formed can be widened and the button-type battery can be securely held in the space without easily jumping out from the case body.

The battery holder for a button-type battery according to the invention is constituted such that a tongue piece is extended from the first preventive part to a substantial center of the opening, and a part of the other flat surface of the button-type battery is held by the tongue piece.

According to a such configuration, the button-type battery can be more securely held in the space in the case body by the tongue piece extended toward the substantial center of the opening.

The battery holder for a button-type battery according to the invention is constituted such that a tongue piece is elastic.

According to a such configuration, as the tongue piece is elastic, the housing of the button-type battery in the case body and the extraction from the case body can be smooth.

The battery holder for a button-type battery according to the invention is constituted such that the base material is a printed wiring board.

According to a such configuration, as various circuit elements can be arranged on the printed wiring board and space in which the button-type battery is arranged and each circuit element are located close, the layout of circuit patterns is easy.

DETAILED DESCRIPTION OF THE PREFERRED EMBODIMENTS

Referring to the drawings, embodiments of battery holder for a button-type battery according to the invention will be described below.

Figure 1:
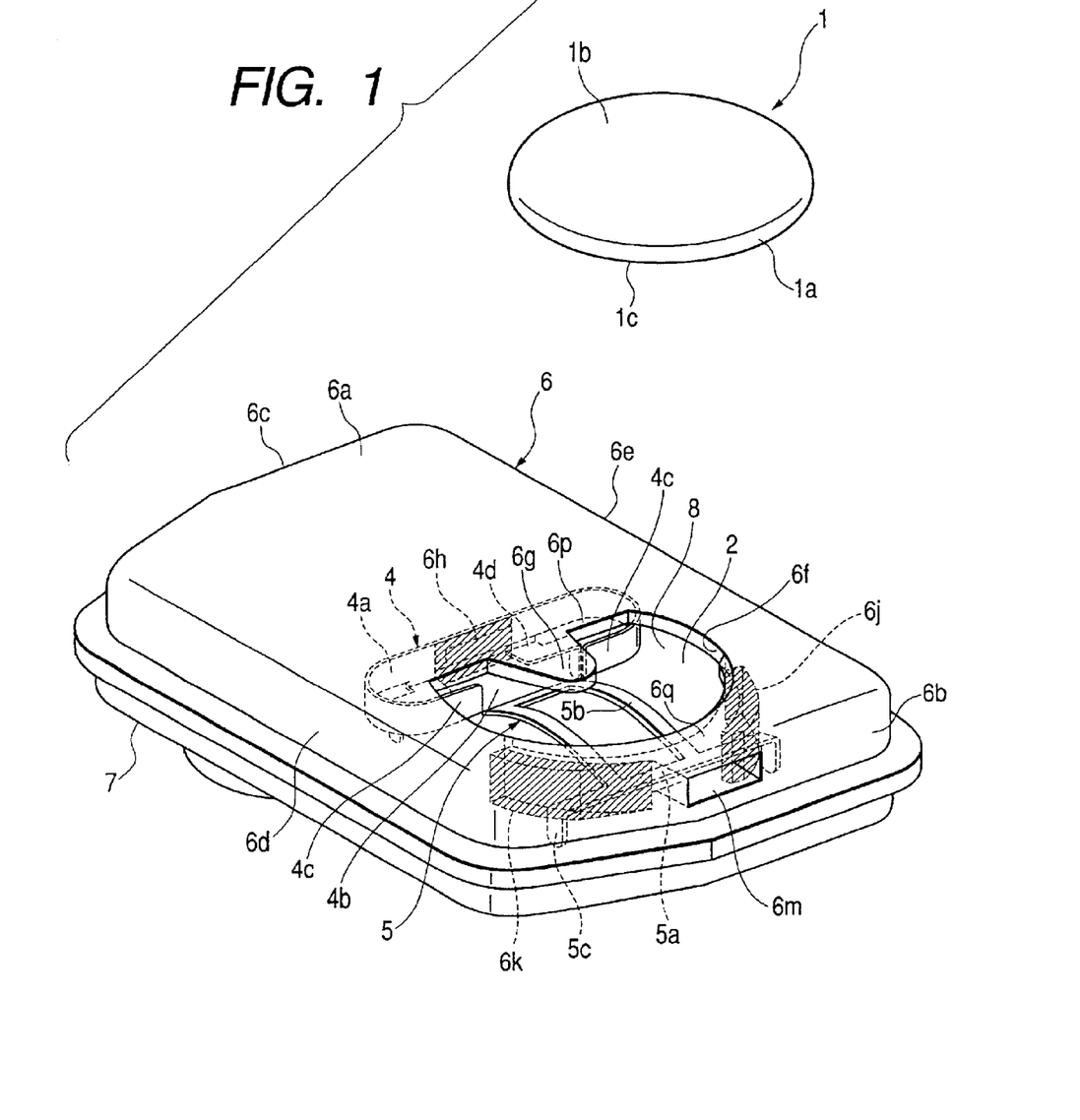
FIG. 1 is a perspective view showing an embodiment of battery holder for a button-type battery according to the invention.
Figure 2:
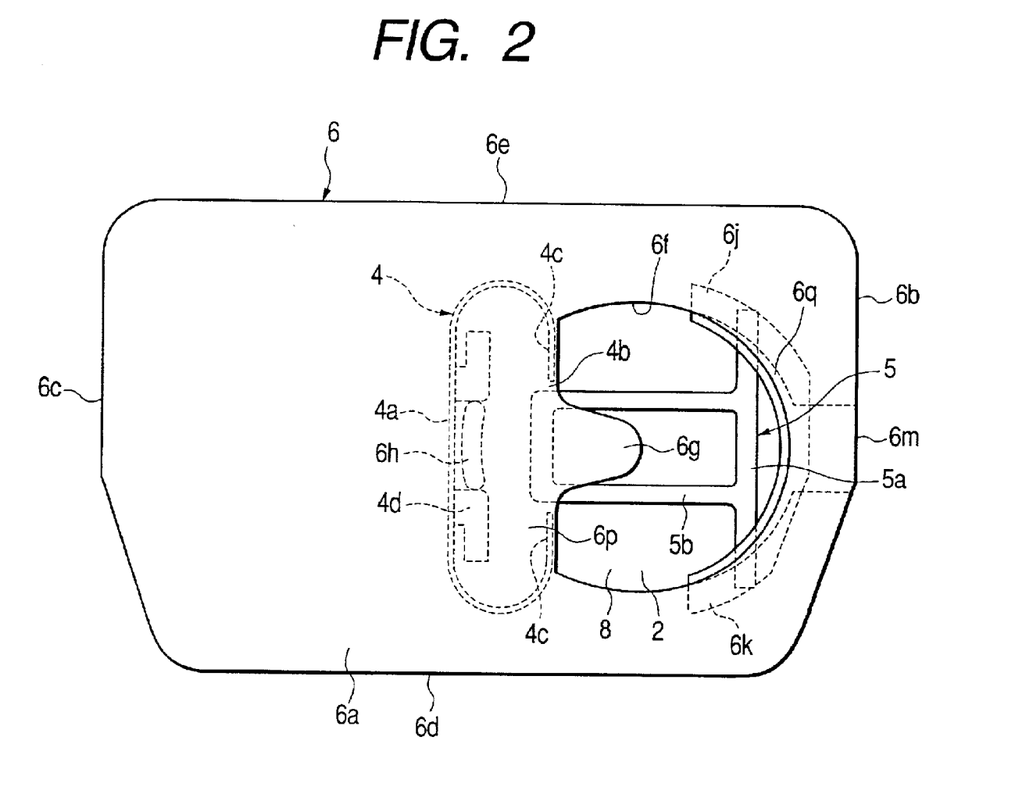
FIG. 2 is a plan showing the embodiment of the battery holder for a button-type battery according to the invention.

FIG. 1 is a perspective view showing an embodiment of the battery holder for a button-type battery according to the invention and FIG. 2 is a plan showing the embodiment of the battery holder for a button-type battery according to the invention.

As shown in FIGS. 1 and 2, the button-type battery 1 is a lithium battery for example and has a predetermined voltage value (for example, 3 V). The button-type battery 1 is disc-like and has a circular side 1a and a pair of opposite flat surfaces 1b and 1c. The circular side 1a and one flat surface 1b are integrated, function as a positive electrode and the other flat surface 1c functions as a negative electrode.

A printed wiring board 2 is made of an insulating material for example, is formed so that it is flat, a predetermined circuit pattern (not shown) is formed on at least one surface, an integrated circuit (not shown) a chip resistor (not shown), a coil system (not shown) for example are electrically connected on the circuit pattern by soldering and are suitably arranged. Plural through holes (not shown) which pierce the printed wiring board 2 are provided in predetermined locations of the circuit pattern (not shown). This printed wiring board 2 functions as a so-called base material.

Figure 3:
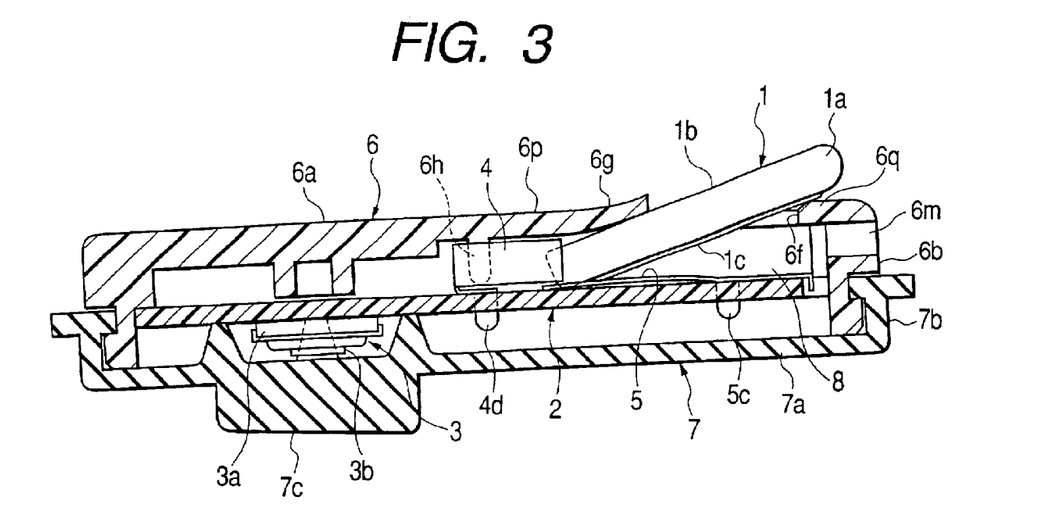
FIG. 3 is an explanatory drawing for explaining operation for inserting (housing) the button-type battery into/in the body of a case in the battery holder for a button-type battery according to the invention.

A pushbutton switch 3 shown in FIG. 3 is provided with a rectangular and flat body 3a for example and a pushbutton key 3b protruded from the body 3a outside. This pushbutton switch 3 is arranged on the side of the lower surface of the printed wiring board 2 in a state in which the pushbutton switch is electrically connected to a circuit pattern (not shown) provided on one side (the side of the lower surface) of the printed wiring board 2 by soldering.

A first terminal 4 is made of an elastic metal planar material for example, is formed by press working, has a predetermined width dimension and is provided with a substantial elliptic first base 4a, a cut part 4b provided in the middle of the first base 4a, a pair of planar first elastic contact parts 4c provided opposite with the cut part 4b between them and a pair of first fixing parts 4d protruded from a predetermined location (for example, the side of the lower end) of the first base 4a to the inside of the first base 4a.

The first terminal 4 is arranged in a predetermined location on the other surface (the upper surface) of the printed wiring board 2, when the first terminal is in this state, a pair of first fixing parts 4d of the first terminal 4 are respectively inserted into through holes (not shown) of the printed wiring board 2 and the ends of a pair of first fixing parts 4d are electrically connected by soldering them on the circuit pattern (not shown). The first terminal 4 is fixed to the printed wiring board 2 by soldering a pair of first fixing parts 4d.

In this state, the first base 4a and a pair of first elastic contact parts 4c are arranged so that they are perpendicular to the other surface of the printed wiring board 2.

A second terminal 5 is made of an elastic metal planar material for example, is formed by press working and is provided with a planar second base 5a, a second elastic contact part 5b in the shape of substantially U extended from the middle of the second base 5a outside the second base 5a and a pair of second fixing parts 5c extended from both ends of the second base 5a in a direction perpendicular to the second base 5a.

The second elastic contact part 5b in the shape of substantially U is in a shape curved downward (swollen) for the second base 5a. The second elastic contact part 5b has elasticity because of the curved shape.

The second terminal 5 is arranged in a predetermined location on the other surface (the upper surface) of the printed wiring board 2, in this state, a pair of second fixing parts 5c of the second terminal 5 are respectively inserted into through holes (not shown) of the printed wiring board 2 and the ends of the pair of second fixing parts 5c are electrically connected by soldering them on the circuit pattern (not shown). The second terminal 5 is fixed to the printed wiring board 2 by soldering the pair of second fixing parts 5c.

Also in this state, the second base 5a and the second elastic contact part 5b are arranged so that they are parallel to the other surface of the printed wiring board 2. A curved (swollen) part of the second elastic contact part 5b is arranged apart from the printed wiring board 2.

The body of a case 6 is made of insulating synthetic resin for example, is formed by molding, is provided with a substantially rectangular upper wall 6a and first, second, third and fourth side walls 6b, 6c, 6d and 6e respectively vertically extended from the peripheral limb of the upper wall 6a, opposite and encircling substantially four directions and the surface opposite to the upper wall 6a is open. The upper wall 6a is provided with an opening 6f close to the side of the first side wall 6b and slightly larger than a substantial semicircle and a tongue piece 6g extended from the substantial center of the upper wall 6a toward the center of the opening 6f. The tongue piece 6g is formed so that it is elastic.

A method of elasticizing the tongue piece 6g is implemented by forming the case body 6 itself with a slightly elastic material, by forming a groove for elastically deforming the tongue piece 6g or by thinning the tongue piece 6g toward the end.

The vicinity of the top (the right side in FIG. 2) of the substantial semicircle of the opening 6f is tilted.

The opening 6f has a short dimension in a direction of the opposite first and second side walls 6b and 6c and a long dimension in a direction of the opposite third and fourth side walls 6d and 6e and is formed so that the short dimension is slightly shorter than a dimension of the diameter of the button-type battery 1 and the long dimension is slightly longer than the dimension of the diameter of the button-type battery 1.

Plural (for example, three) circumferential walls 6h, 6j and 6k in the shape of an arc, perpendicular to the inner bottom, substantially circular as a whole and having a cut-out part in respective middles are stood on the inner bottom of the upper wall 6a, the circumferential wall 6h is arranged in the substantial center of the inner bottom of the upper wall 6a and the circumferential walls 6j and 6k are arranged in the vicinity of the first side wall 6b.

The diameter of the substantially circular circumferential walls 6h, 6j and 6k as a whole is made slightly larger, compared with the diameter of the button-type battery 1 and the circumferential walls 6h, 6j and 6k are arranged so that they substantially encircle the opening 6f.

A first preventive part 6p for preventing the button-type battery 1 from jumping out via the opening 6f is provided between the circumferential wall 6h and the opening 6f and a second preventive part 6q for preventing the button-type battery 1 from jumping out via the opening 6f is provided between each circumferential wall 6j, 6k and the opening 6f. In other words, the first preventive part 6p and the second preventive part 6q are integrated with the upper wall 6a as a part of it.

A part of the periphery of one flat surface 1b of the button-type battery 1 is held by the first preventive part 6p and the second preventive part 6q and they are formed as a preventive part for preventing the button-type battery 1 from jumping out via the opening 6f.

The tongue piece 6g is extended from the first preventive part 6p in a direction of the center of the opening 6f.

A hole 6m communicating with the case body 6 is provided in the substantial center of the first side wall 6b and is arranged between the circumferential wall 6j and the circumferential wall 6k.

In the case body 6, the printed wiring board 2 on which the first terminal 4 and the second terminal 5 are fixed is housed and arranged and is fitted to the case body 6 by suitable means such as snap fitting. That is, the printed wiring board (base material) 2 is arranged opposite to the upper wall 6a of the case body 6 and space 8 is provided between the upper wall 6a of the case body 6 and the printed wiring board (base material) 2.

In this state, the first terminal 4 and the second terminal 5 are arranged opposite to the inner bottom of the upper wall 6a, that is, the first terminal 4 and the second terminal 5 are arranged in the space 8. The circumferential wall 6h is arranged in the vicinity of the inside of the substantially elliptic first base 4a of the first terminal 4, the second elastic contact part 5b in the shape of substantially U of the second terminal 5 is opposite to the opening 6f and is arranged so that it is exposed from the opening 6f.

An elastic cover 7 shown in FIG. 3 is made of insulating elastic rubber for example, is formed by molding and is provided with a substantially rectangular bottom wall 7a, a side wall 7b vertically extended from the peripheral limb of the bottom wall 7a and encircling substantially four directions and a pushbutton part 7c provided in a predetermined locations of the bottom wall 7a and protruded outside. The elastic cover 7 is arranged so that it covers the side of the open surface (the bottom) of the case body 6.

In this state, the pushbutton part 7c of the elastic cover 7 is arranged opposite to the pushbutton switch 3.

Next, operation for inserting (housing) or extracting the button-type battery into/from the case body in the battery holder for a button-type battery will be described.

Figure 4:
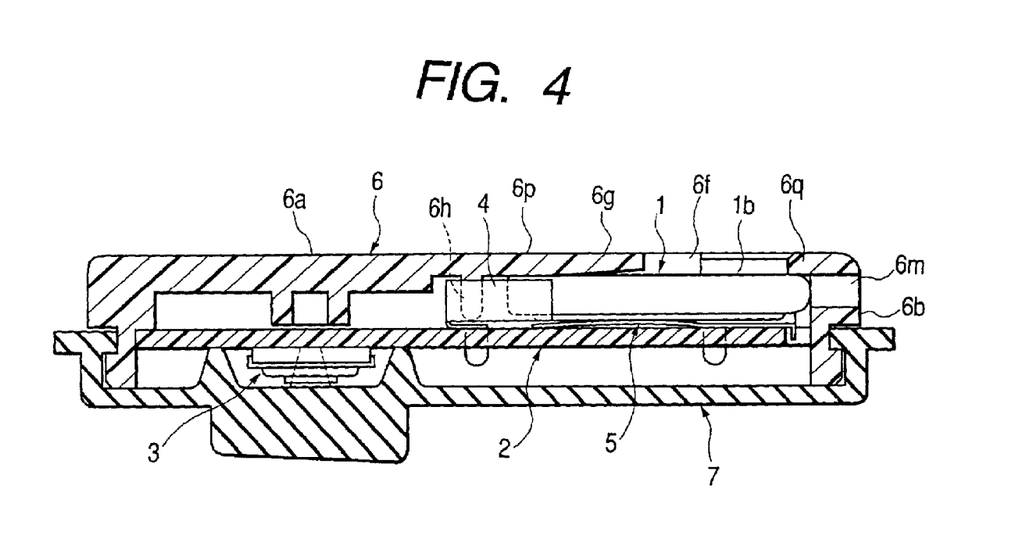
FIG. 4 is an explanatory drawing for explaining a state in which the button-type battery is housed in the case body in the battery holder for a button-type battery according to the invention.
Figure 5:
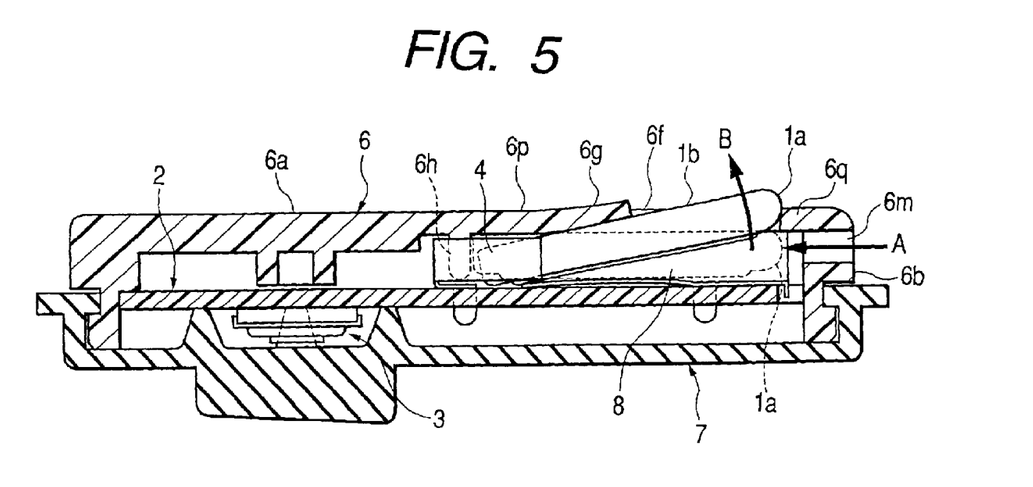
FIG. 5 is an explanatory drawing for explaining operation for extracting the button-type battery from the case body in the battery holder for a button-type battery according to the invention.

FIG. 3 is an explanatory drawing for explaining the operation for inserting (housing) the button-type battery into the case body in the battery holder for a button-type battery, FIG. 4 is an explanatory drawing for explaining operation for housing the button-type battery in the case body in the battery holder for a button-type battery and FIG. 5 is an explanatory drawing for explaining the operation for extracting the button-type battery from the case body in the battery holder for a button-type battery.

First, referring to FIGS. 3 and 4, the operation for inserting (housing) the button-type battery into the space in the case body will be described.

When a part of the circular side 1a of the button-type battery 1 is inserted from the opening 6f against the spring of the tongue piece 6g when the button-type battery 1 is inserted from the opening 6f of the case body 6, the tongue piece 6g is pushed up outside together with the upper wall 6a because the tongue piece 6g is elastic. When the button-type battery 1 is further pushed into the opening 6f, the circular side 1a is touched to the first elastic contact part 4c of the first terminal 4 and the button-type battery 1 enters the space 8 against the spring of the first elastic contact part 4c.

Afterward, the button-type battery 1 is moved to the side of the first side wall 6b of the case body 6 by the elastic contact force of the first elastic contact part 4c and is touched to the circumferential walls 6j and 6k provided in the vicinity of the hole 6m of the first side wall 6b. Hereby, one flat surface 1b of the button-type battery 1 is pushed up by the second elastic contact part 5b of the second terminal 5, however, the flat surface is stopped by the first preventive part 6p, the second preventive part 6q and the tongue piece 6g and the button-type battery 1 is housed in the space 8 without jumping out from the opening 6f as shown in FIG. 4.

In this state, a part of the circular side 1a of the button-type battery 1 is arranged close to the hole 6m of the first side wall 6b. The circular side 1a is elastically touched to the first terminal 4, the other flat surface 1c is elastically touched to the second terminal 5 and arranged and hereby, a positive electrode and a negative electrode are mechanically and electrically connected to the first terminal 4 and the second terminal 5.

Next, referring to FIG. 5, the operation for extracting the button-type battery from the space in the case body will be described.

First, when the button-type battery 1 housed in the space in the case body is extracted from the opening 6f of the case body 6, an extracting tool (not shown) such as a driver and a pin is inserted from a direction shown by an arrow A of the hole 6m of the first side wall 6b and the end of the extracting tool is touched to a part of the circular side 1a of the button-type battery 1.

Next, the button-type battery 1 is pushed against the spring of the first terminal 4 by the extracting tool touched to the circular side 1a, is moved to the side of the circumferential wall 6h and a part of the flat surface 1b of the button-type battery 1 is released from fitting in the second preventive part 6q.

The button-type battery 1 is pushed from the opening 6f toward the outside (in a direction shown by an arrow B) by the spring of the second terminal 5 as the button-type battery 1 is moved. At this time, as the flat surface 1b of the button-type battery 1 is pressed on the side of the space 8 by the spring of the tongue piece 6g, the button-type battery 1 never jumps out from the opening 6f.

Hereby, the button-type battery 1 does not jump out from the opening 6f or roll out and an operator is released from being anxious about the handling of the button-type battery 1.

In this state, the operator grasps the circular side 1b of the button-type battery 1 with fingertips and extracts it from the opening 6f.

As the tongue piece 6g is in the shape of a tongue and is surrounded by the opening 6f, the work is easy when the button-type battery 1 is extracted with fingertips.

In the abovementioned embodiment, the case that the tongue piece 6g is elastic is described, however, the invention is not limited to this and if the tongue piece 6g is slightly shortened, it is not required that the tongue piece is elastic.

As described above, according to the battery holder for a button-type battery according to the invention, the battery holder for a button-type battery can be provided wherein as the button-type battery can be securely held by a pair of preventive parts in the case body and operation for extracting the button-type battery is performed via the hole of the side wall, a preventive part can also be formed in the hole, therefore, a range in which the preventive part is formed can be widened, compared with the conventional type preventive part and the button-type battery does not jump out of the case body easily.

Also, according to the battery holder for a button-type battery according to the invention, the button-type battery can be more securely held in the case body by the tongue piece extended toward the substantial center of the opening.

Also, according to the battery holder for a button-type battery according to the invention, the button-type battery can be smoothly housed in the case body and can be smoothly extracted from the case body respectively by the elastic tongue piece.

Also, according to the battery holder for a button-type battery according to the invention, various circuit elements can be arranged on the printed wiring board (base material) and as space in which the button-type battery is arranged and each circuit element are close, the layout of the circuit pattern is easy.

What is claimed is:

1. A battery holder for a battery having a circular side and flat surfaces, the battery holder made of an insulating material and comprising:
   a case body having an upper wall and a side wall provided to a limb of the upper wall;
   a base material arranged on an open side of the side wall of the case body such that space exists between the upper wall and the base material; and an elastic first terminal and an elastic second terminal arranged in the space between the upper wall and the base material and provided on the base material, wherein an opening as well as first and second preventive parts respectively opposite in a part of the limb of the opening are provided to the upper wall of the case body;

wherein the upper wall completely surrounds the opening, wherein a circumferential wall corresponding to the circular side of the battery is provided in a vicinity of the second preventive part, wherein a hole communicating with the space penetrates the side wall of the case body, wherein the hole is located on a second preventive part side of the opening, wherein the first terminal is provided opposite to the first preventive part, wherein the second terminal is provided such that the second terminal faces the opening, wherein the battery is inserted from the opening into the space, wherein the first terminal is elastically touched to the circular side of the battery, wherein the battery is pressed in a direction of the circular side opposite to the elastically touched circular side, wherein the circular side is touched to the circumferential wall and the second terminal is elastically touched to one of the flat surfaces of the battery, wherein the battery is pressed in a direction of the other of the flat surfaces of the battery, wherein the other of the flat surfaces is touched to inner faces of the first and second preventive parts and the battery is housed in the space, wherein when the battery housed in the space is extracted from the case body, the battery is moved against an elastic contact force of the first terminal via the hole of the side in the case body, wherein prevention by the second preventive part is released, and wherein the battery can be extracted from the opening of the case body.

2. The battery holder for a battery according to claim 1, wherein a tongue piece is extended from the first preventive part to a substantial center of the opening, and wherein a part of the other of the flat surfaces of the battery is held by the tongue piece.

3. The battery holder for a battery according to claim 2, wherein the tongue piece is elastic.

4. The battery holder for a battery according to claim 1, wherein the base material is a printed wiring board.

5. The battery holder for a battery according to claim 2, wherein the base material is a printed wiring board.

6. The battery holder for a battery according to claim 3, wherein the base material is a printed wiring board.

7. The battery holder for a battery according to claim 1, wherein the side wall in which the hole is formed is disposed around the battery, and the hole communicates with the space from a side surface of the side wall.

8. The battery holder for a battery according to claim 1, wherein a diameter of the hole is less than a distance between the base material and a bottom of the upper wall.

9. The battery holder for a battery according to claim 1, wherein a diameter of the hole is about the same as a diameter of the circumferential wall.

10. The battery holder for a battery according to claim 1, wherein the upper wall disposed above the hole is continuous.

11. The battery holder for a battery according to claim 2, wherein the tongue piece is elastically deformed to increase an area of the opening when the battery is inserted.

* * * * *